United States Patent
Nakai (10) Patent No.: US 7,596,308 B2
(45) Date of Patent: Sep. 29, 2009

(54) LENS POSITION ADJUSTING APPARATUS, LENS POSITION ADJUSTING METHOD AND COMPUTER-READABLE MEDIUM

(75) Inventor: Takao Nakai, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 433 days.

(21) Appl. No.: 11/546,471

(22) Filed: Oct. 11, 2006

(65) Prior Publication Data

US 2007/0086767 A1   Apr. 19, 2007

(30) Foreign Application Priority Data

Oct. 13, 2005   (JP)   ............................. 2005-299073

(51) Int. Cl.
G03B 3/10   (2006.01)
G03B 13/00   (2006.01)

(52) U.S. Cl. ......................... 396/101; 348/353; 348/356

(58) Field of Classification Search .................. 396/77, 396/79, 96, 101, 133; 348/353, 354, 356
See application file for complete search history.

(56) References Cited

U.S. PATENT DOCUMENTS 6,552,748 B1 *   4/2003   Sugimoto .................... 348/354

FOREIGN PATENT DOCUMENTS

JP   11-088760 A   3/1999

OTHER PUBLICATIONS

Machine translation in English of JP 11-088760, 8 pages, Mar. 30, 1999.*

* cited by examiner

*Primary Examiner*—Melissa J Koval
(74) *Attorney, Agent, or Firm*—Frishauf, Holtz, Goodman & Chick, P.C.

(57) ABSTRACT

A CPU 11 in a digital camera 1 determines that the photography environment is dark and includes a spot light source, in the case where the number of pixels that have a higher luminosity than a first threshold to the total number of pixels in the focus area exceeds a first certain proportion and the number of pixels that have a lower luminosity than a second threshold to the total number of pixels in the focus area exceeds a second certain proportion, on the basis of a luminosity signal Y which has been acquired. Subsequently, the CPU 11 reads out a coefficient value of a cut-off frequency from a memory 110, inputs it to an HPF 9 thereby setting the cut-off frequency fc higher.

14 Claims, 4 Drawing Sheets

LENS POSITION ADJUSTING APPARATUS, LENS POSITION ADJUSTING METHOD AND COMPUTER-READABLE MEDIUM

CROSS-REFERENCE TO RELATED APPLICATION

This application is based upon and claims the benefit of priority from the prior Japanese Patent Application No. 2005-299073, filed Oct. 13, 2005, the entire contents of which is incorporated herein by reference.

BACKGROUND OF THE INVENTION

1. Field of the Invention

The present invention relates to a lens position adjusting apparatus, a lens position adjusting method and computer-readable medium. More particularly, the present invention relates to a lens position adjusting apparatus, a lens position adjusting method and computer-readable medium based on auto-focusing (hereinafter, referred to as AF) processing using a focus evaluation parameter.

2. Description of the Related Art

Contrast-based auto-focusing has been conventionally cited as a representative AF processing. This method extracts a high frequency component from image data picked up at individual lens positions using a high path filter (hereinafter, referred to as HPF) while moving a focus lens, thereby sequentially calculating a focus evaluation parameter, and then moves the focus lens to a lens position at which the evaluation focus parameter reaches the peak.

In addition, recently, an art to increase accuracy of AF has emerged by setting a cut-off frequency to be inputted to the HPF higher than ordinary cases, in the case where the AF processing is to be performed under a dark photography environment in which a spot light source is present, such as night photography.

This method is described for example in Japanese Laid-Open (Kokai) Patent Publication No. 11-88760 (1999).

Specifically, this method splits an image which has been picked up into a plurality of areas, integrates luminous signals in the plurality of areas, and compares the integrated value of the luminous signals in the plurality of areas with a reference value which has been set in advance. The camera judges that the photographing is conducted under a dark environment and switches to an HPF with a high cut-off frequency, if the proportion of a number of areas in which the integrated value is smaller than the reference value to a total number of areas exceeds a certain proportion.

SUMMARY OF THE INVENTION

The object of the present invention is to provide a lens position adjusting apparatus, a lens position adjusting method and computer-readable medium that are capable of increasing accuracy in auto-focusing by applying a cut-off frequency depending on the photography conditions.

In order to achieve the above-mentioned object, the present invention provides a lens position adjustment apparatus comprising: a lens; an imaging section for detecting light inputted thereto through the lens and outputting image data; a determination section for determining whether or not both a high luminosity area and a low luminosity area are present in the image data, on the basis of the image data outputted by the imaging section; a control section for controlling a cut-off frequency to be set for a high-pass filter (HPF) which extracts a high frequency component from the image data, in the case where the determination section determines that both a high luminosity area and a low luminosity area are present; a calculation section for calculating an evaluation focus parameter for each position of the lens, on the basis of the high frequency component acquired by the control section via the HPF for which a cut-off frequency has been set; and a lens position adjustment section for positioning the lens at the position where the evaluation focus parameter calculated by the calculation section becomes the maximum value.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the preferred embodiments of the present invention will be described with reference to the drawings as an example of application of a lens position adjusting apparatus of the present invention to a digital camera.

A. Configuration of the Digital Camera

Figure 1:
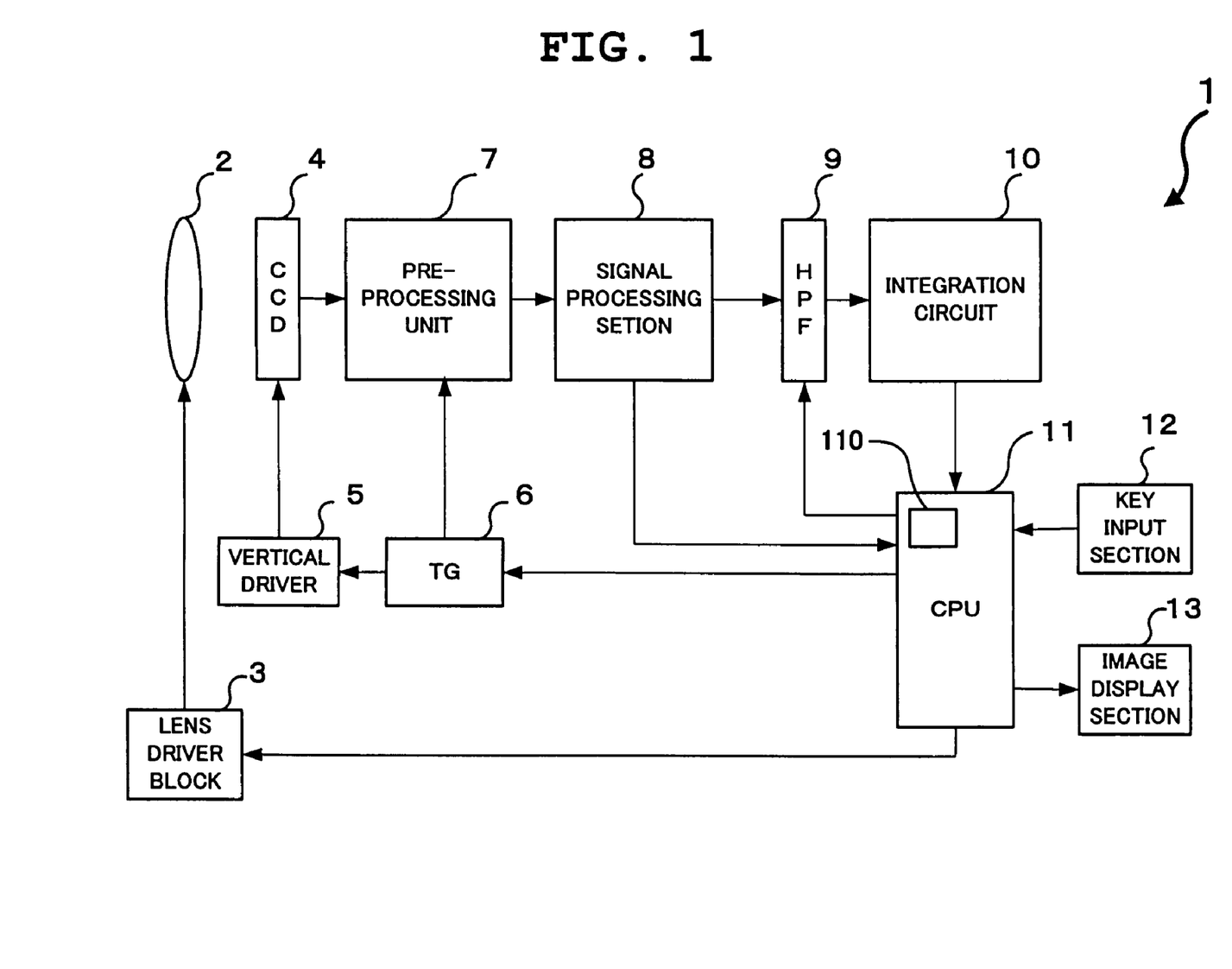
FIG. 1 is a block diagram of a digital camera in an embodiment of the present invention.

FIG. 1 is a block diagram showing the general electrical outline configuration of a digital camera 1.

The digital camera 1 includes an image pickup lens 2, a lens driver block 3, a CCD 4, a vertical driver 5, a timing generator (TG) 6, a pre-processing unit 7, a signal processing section 8, an HPF 9, an integration circuit 10, a CPU 11, a key input section 12 and an image display section 13.

The image pickup lens 2 includes a focus lens and a zoom lens, not shown, and is connected to the lens driver block 3. The lens driver block 3 is configured with a focus motor and a zoom motor for driving the focus lens and the zoom lens, not shown, respectively in the optical axis direction, and a focus motor driver and a zoom motor driver for driving the focus motor and the zoom motor in accordance with a control signal from the CPU 11.

The CCD 4 scan-driven by the vertical driver 5 photoelectrically converts the intensity of light of the respective colors in RGB values of an object image at certain time intervals and outputs it to the pre-processing unit 7 as the imaging signals (image data). The operation timing of the vertical driver 5 and the pre-processing unit 7 is controlled by the CPU 11 via the TG 6.

The pre-processing unit 7 which is connected to the TG 6 is configured with a correlated double sampling (CDS) circuit for performing correlated double sampling of imaging signals that are outputted from the CCD 4 and holding them, an automatic gain control (AGC) circuit for performing automatic gain control of the sampled imaging signals, and an analog to digital (A/D) converter for converting the automatic-gain-controlled analog signals. The imaging signals of the CCD 4 are sent as digital signals to the signal processing section 8 via the pre-processing unit 7.

The signal processing section 8 generates luminosity color difference signals (YUV) on the basis of the inputted imaging signals. Next, the signal processing section 8 outputs the generated luminosity color difference signals (YUV) to the CPU 11, and outputs luminosity signals Y to the HPF 9.

The CPU 11, including a control program necessary for the control and a memory in which necessary data is recorded, operates in accordance with the program.

In addition, the CPU 11 includes a memory 110. The memory 110 accommodates a plurality of coefficient values of a cut-off frequency to be inputted to the HPF 9. In addition, the CPU 11 determines a photography environment on the basis of the luminosity signals Y sent from the signal processing section 8, reads out the coefficient value of the cut-off frequency from the memory 110, and performs processing of inputting it to the HPF 9 thereby setting a cut-off frequency fc (that is, processing of setting the cut-off frequency higher or lower). In addition, the CPU 11 controls the lens driver block 3 so as to move the focus lens to the focus position on the basis of a focus evaluation parameter sent from the integration circuit 10.

The HPF 9 outputs the luminosity signal Y (high-frequency components) which has a higher frequency than the cut-off frequency fc set by the CPU 11 to the integration circuit 10 among the luminosity signals Y sent from the signal processing section 8.

The integration circuit 10 integrates the high-frequency components sent from the HPF 9 to calculate the focus evaluation parameter, and outputs the calculated focus evaluation parameter to the CPU 11.

The key input section 12 includes a plurality of operation keys, such as a shutter button enabling both halfway depressed manipulation and fully depressed manipulation, and outputs operation signals corresponding to a key operation of a user to the CPU 11.

The image display section 13 includes a color LCD and its driver circuit. In a photographing mode, it displays the image data picked up by the CCD 4 and stored in a DRAM (buffer memory), not shown. At the time of reproduction, it displays the recorded image data which is readout from a flash memory, not shown, and expanded.

B. Operation of the CPU 11

Next, the function of the CPU 11 which characterizes the present invention will be explained.

When the shutter button is halfway depressed by the user, the CPU 11 controls the CCD 4 to perform imaging processing via the TG 6 and the vertical driver 5, and acquires a single piece of luminosity color difference signals (YUV data) acquired by the imaging processing and generated by the signal processing section 8.

Subsequently, the CPU 11 determines whether or not both a high luminosity area and a low luminosity area are present in a focus area on the basis of the acquired luminosity signals Y.

Determination on whether or not a high luminosity area is present in the focus area is made based on whether or not the proportion of pixels (determined on the basis of the luminous signals Y acquired from the focus area) that have a higher luminosity than a first threshold to the total number of pixels in the focus area exceeds a first certain proportion.

The first certain proportion has been determined in advance. For example, the CPU 11 determines that a high luminosity area is present if the proportion is higher than 0.3%.

In addition, the first threshold as described above is, for example, 70 to 80% of the maximum luminosity value which can be detected by the CCD 4.

On the other hand, determination on whether or not a low luminosity area is present in the focus area is made based on whether or not the proportion of pixels (determined on the basis of the luminous signals Y acquired from the focus area) that have a lower luminosity than a second threshold to the total number of pixels in the focus area exceeds a second certain proportion.

The second certain proportion has been determined in advance. For example, the CPU 11 determines that a low luminosity area is present if the proportion is higher than 1 to 2%.

In addition, the second threshold as described above is, for example, 20 to 30% of the maximum luminosity value which can be detected by the CCD 4.

The first certain proportion is set smaller than the second certain proportion. Accordingly, it is possible to increase accuracy in the determination on whether or not a high luminosity area is present and the determination on whether or not a low luminosity area is present.

In the case where the total number of pixels in the focus area is a fixed value, the determination may be made directly on the basis of the number of pixels, in place of the proportion to the total number of pixels in the focus area as described above.

In this case, a first certain number of pixels is used in place of the first certain proportion, and a second certain number of pixels is used in place of the second certain proportion.

In addition, the first certain number of pixels is set smaller than the second certain number of pixels. Accordingly, it is possible to increase accuracy in the determination on whether or not a high luminosity area is present and the determination on whether or not a low luminosity area is present.

With such setting being made in advance, the CPU 11 determines that a high luminosity area is present if the number of pixels that have a higher luminosity than the above-described first threshold is larger than the above-described first certain number of pixels, and it determines that a low luminosity area is present if the number of pixels that have a lower luminosity than the second threshold is larger than the second certain number of pixels.

As described above, when the CPU 11 determines that both a high luminosity area and a low luminosity area are present in the focus area, it judges that the photography environment is dark and includes a point light source, reads out the coefficient value of the cut-off frequency from the memory 110, and inputs it to the HPF 9 thereby setting the cut-off frequency fc higher. That is, the CPU 11 sets a high cut-off frequency for the HPF 9.

On the other hand, when the CPU 11 determines that either of a high luminosity area or a low luminosity area is not present in the focus area (including a case where only one of the high luminosity area and the low luminosity area is present), it judges that a contrast is low, reads out the coefficient value of the cut-off frequency from the memory 110, and inputs it to the HPF 9 thereby setting the cut-off frequency fc lower. That is, the CPU 11 sets a low cut-off frequency for the HPF 9.

After the CPU 11 sets the cut-off frequency fc for the HPF 9, it starts processing of detecting a focus lens position at which the focus evaluation parameter is the highest.

C. Operation of the Digital Camera 1

Figure 2:
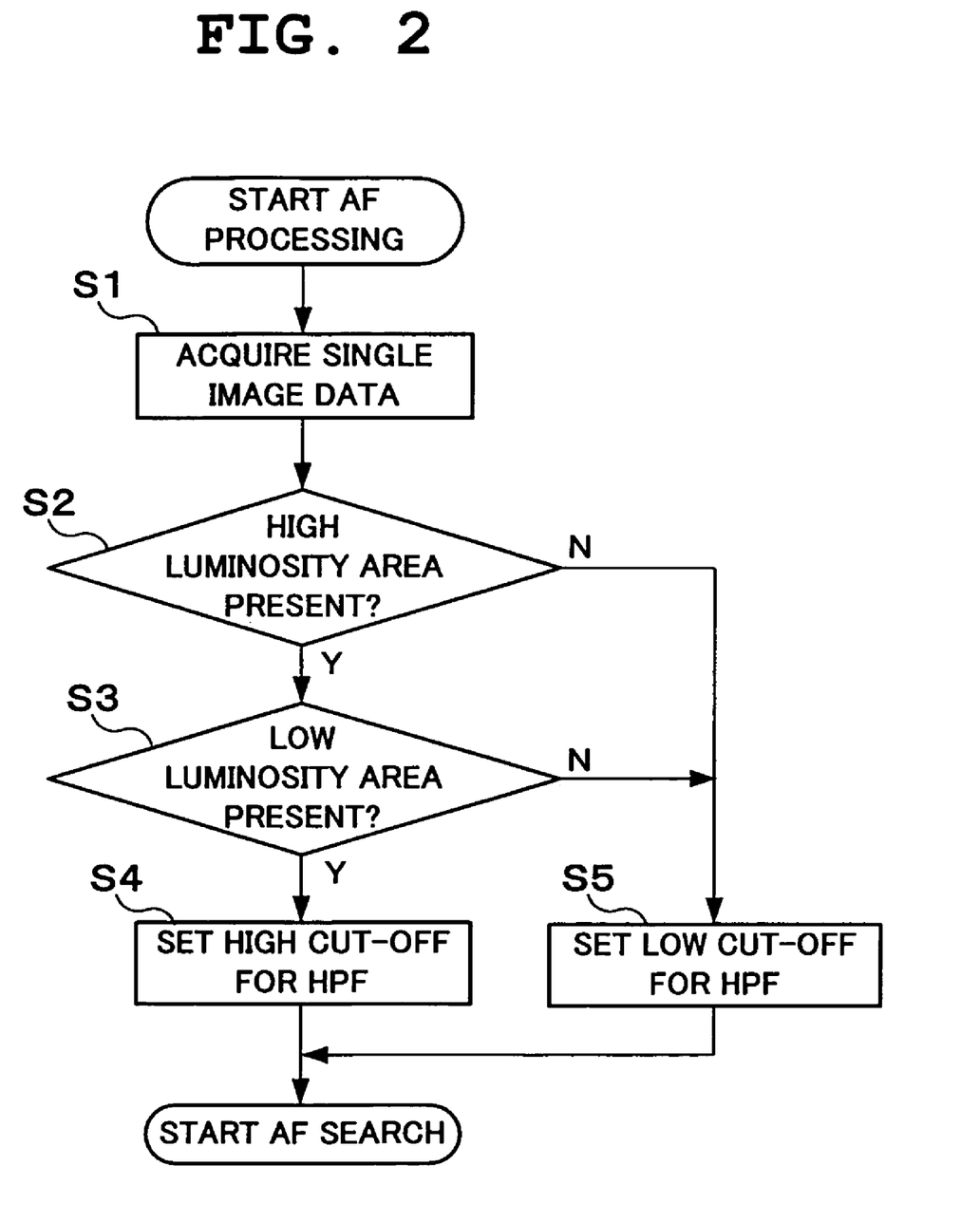
FIG. 2 is a flowchart showing an operation of the digital camera according to the embodiment.

Next, the operation of the digital camera 1 in the embodiment will be explained according to the flowchart in FIG. 2.

When the mode is set to the photography mode by operation by a user of the mode selection key of the key input section 12, the CPU 11 starts a so called through image display in which the CPU 11 starts driving of the CCD 4 for imaging via the TG 6 and the vertical driver 5, stores the image data of the luminosity color difference signals (YUV data) generated by the signal processing section 8 in a buffer memory (not shown), and controls the image display section 13 to display the stored image data.

This through image display is continued until the CPU 11 judges that the shutter button has been halfway depressed by the user, that is, until the operation signal corresponding to the halfway depression manipulation of the shutter button has been sent from the key input section 12. When the CPU 11 judges that the shutter button has been halfway depressed, the process advances to Step S1 in FIG. 2.

When the process advances to Step S1, the CPU 11 acquires a single piece of image data of luminosity color difference signal (YUV data) which is picked up by the CCD 4 and generated by the signal processing section 8.

Next, the CPU 11 determines whether or not a high luminosity area is present in the focus area on the basis of the acquired luminosity signal Y (Step S2).

The determination is made based on whether or not the proportion of the number of pixels (determined on the basis of the luminous signals Y acquired from the focus area) which have a higher luminosity than the first threshold (and which are determined on the basis of the luminosity signal Y acquired from the focus area) to the total number of pixels in the focus area exceeds the first certain proportion (for example, 0.3%).

If the CPU 11 determines that a high luminosity area is present in the focus area in Step S2, the CPU 11 subsequently determines whether or not there is a low luminosity area in the focus area (Step S3).

The determination is made based on whether or not the proportion of the number of pixels (determined on the basis of the luminous signals Y acquired from the focus area) which have a lower luminosity than the second threshold to the total number of pixels in the focus area exceeds the second certain proportion (for example, 1 to 2%).

If the CPU 11 determines that a low luminosity area is also present in the focus area, it determines that the photography environment is dark and includes a spot light source, reads out the coefficient value of the cut-off frequency from the memory 110, and inputs it to the HPF 9 thereby setting the cut-off frequency fc higher (Step S4).

On the other hand, if the CPU 11 determines that a high luminosity area is not present in the focus area in Step S2, or if it determines that a low luminosity area is not present in the focus area in Step S3, it determines that the contrast is low, reads out the coefficient value of the cut-off frequency from the memory 110, and inputs it to the HPF 9 thereby setting the cut-off frequency fc lower (Step S5).

Subsequently, when the cut-off frequency fc to be set for the HPF 9 is set in Step S4 or Step S5, the CPU 11 starts search for the lens position at which the evaluation focus parameter reaches the peak.

Specifically, while moving the position of the focus lens from one end (for example, on the wider end) of the lens to the other end (for example, the tele end) of the lens, the CPU 11 extracts a high frequency component from the luminosity signal Y of the image data outputted by the CCD 4 at certain time intervals using the HPF 4 to which the above-described cut-off frequency fc has been inputted and set, thereby calculating the evaluation focus parameter at each lens position and detecting the lens position at which the evaluation focus parameter becomes the maximum value. That is to say, CPU 11 detects the evaluation focus parameter at each lens position and detects the lens position at which the evaluation focus parameter becomes the maximum value.

Subsequently, when the position at which the evaluation focus parameter becomes the maximum value is detected, the CPU 11 moves the focus lens to the detected position, whereby the AF processing is complete.

Meanwhile, in the case where the maximum value of the evaluation focus parameter is detected while moving the focus lens from one end of the lens to the other end of the lens, the CPU 11 may stop moving the focus lens, and then move the focus lens to the detected position.

D. Modification

D-1. Modification 1

In the above-described embodiment, the determination on whether or not a high luminosity area and a low luminosity area are present is made in a manner as follows: if the proportion of the number of pixels that have a higher luminosity than the first threshold to the total number of pixels in the focus area is larger than the first certain proportion, it is determined that a high luminosity area is present; and if the proportion of the number of pixels which have a lower luminosity than the second threshold to the total number of pixels in the focus area is larger than the second certain proportion, it is determined that there is a low luminosity area. Alternatively, the determination may be made in the manner as described below.

Figure 3A:
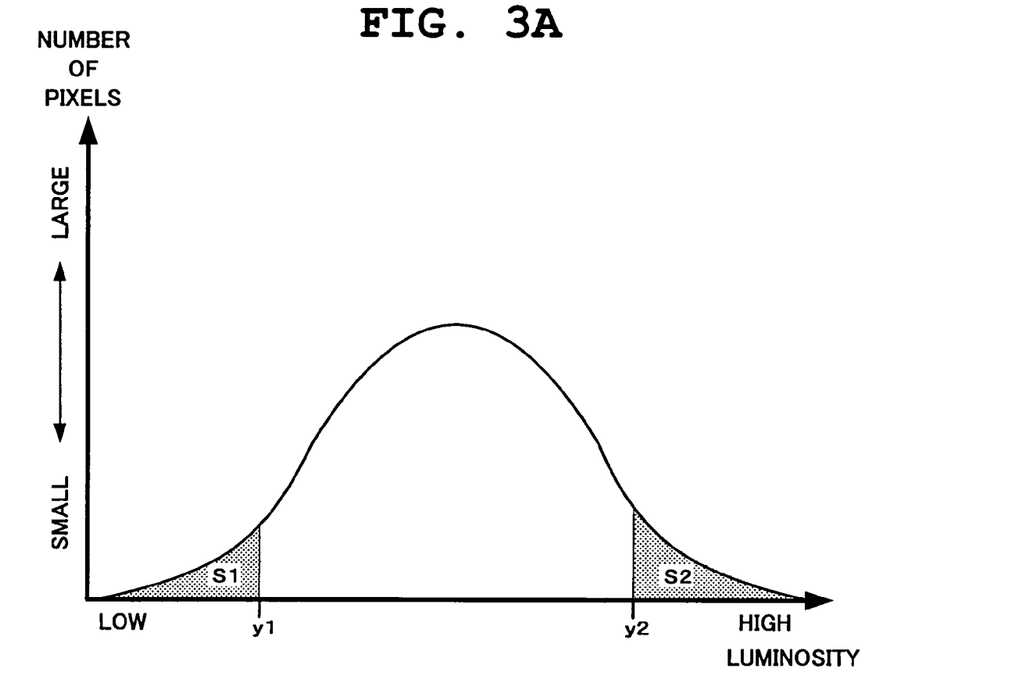
FIG. 3A is a histogram of luminosity of pixels in a focus area when both a high luminosity area and a low luminosity area are present.
Figure 3B:
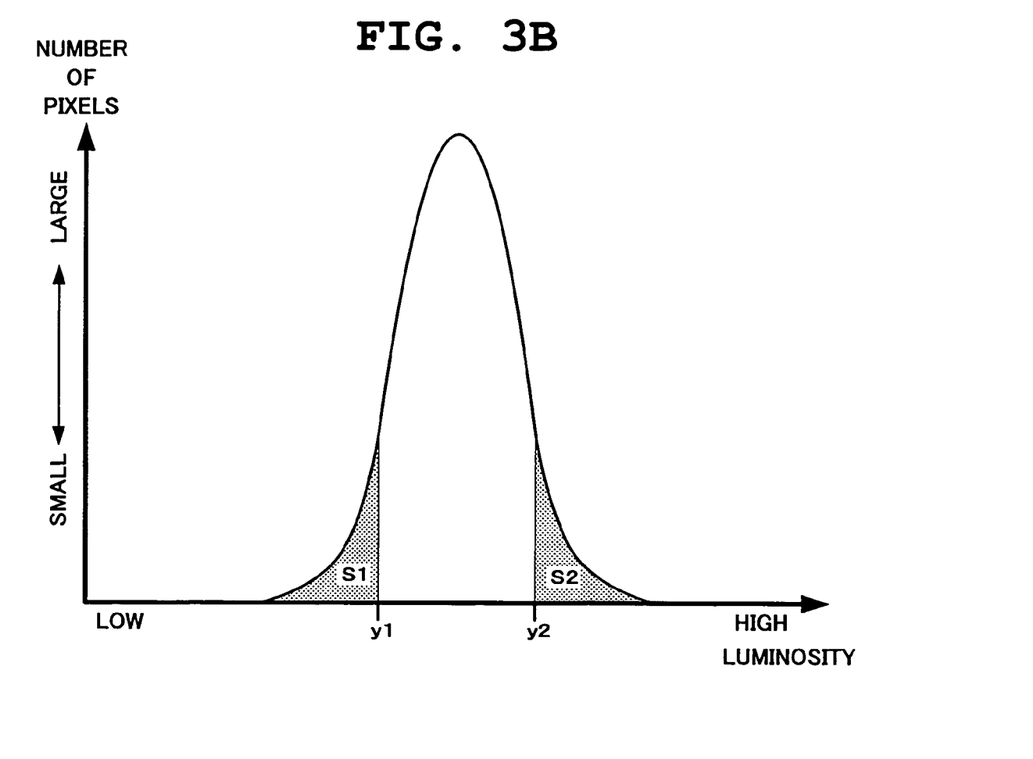
FIG. 3B is a histogram of luminosity of pixels in a focus area when either of a high luminosity area or a low luminosity area is present.

FIGS. 3A and 3B respectively show histograms of luminosity of the pixels in the focus area.

The luminosity at which the proportion of the number of pixels having a low luminosity to the total number of pixels in the focus area becomes a third certain proportion S1 is assumed to be a luminosity y1, and the luminosity at which the proportion of the number of pixels having a high luminosity to the total number of pixels in the focus area becomes a fourth certain proportion S2 is assumed to be a luminosity y2. If the difference between the luminosity y1 and the luminosity y2 is larger than a third threshold, it is determined that both a low luminosity area and a high luminosity area are present. On the other hand, if the difference between the luminosity y1 and the luminosity y2 equals or is less than the third threshold, it is determined that either of a low luminosity area or a high luminosity area is not present (including a case where only one of the low luminosity area and the high luminosity area is present).

Specifically, the above-described third certain proportion S1 and the above-described fourth certain proportion S2 have been determined in advance. The number of pixels is counted starting from the pixel having a low luminosity, and the luminosity which corresponds to the third certain proportion S1 is assumed to be y1. Also, the number of pixels is counted starting from the pixel having a high luminosity, and the luminosity which corresponds to the fourth certain proportion S2 is assumed to be y2. If the difference between the luminosities y1 and y2 at that time is larger than the threshold, it is determined that both a high luminosity area and a low luminosity area are present.

In the case where the total number of pixels in the focus area is a fixed value, the determination may be made directly on the basis of the number of pixels, in place of the above-described proportion to the total number of pixels in the focus area.

FIG. 3A is a histogram of luminosity of the pixels in the focus area when both a high luminosity area and a low luminosity area are present, showing a large difference between the luminosity y1 and the luminosity y2. That is, it is apparent that there is a large difference between the luminosity y1 and the luminosity y2.

FIG. 3B is a histogram of luminosity of the pixels in the focus area when either of a high luminosity area or a low luminosity area is present, showing a small difference between the luminosity y1 and the luminosity y2. That is, it is apparent that there is a small difference between the luminosity y1 and the luminosity y2.

D-2. Modification 2

In the above-described embodiment, only one HPF is provided and the cut-off frequency which is to be inputted and set is changed depending on the case where the photography environment is dark and includes a point light source and the case where the contrast is low. Alternatively, an HPF for which the cut-off frequency has been set high and an HPF for which the cut-off frequency has been set low may be provided so as to be switched there between.

Figure 4:
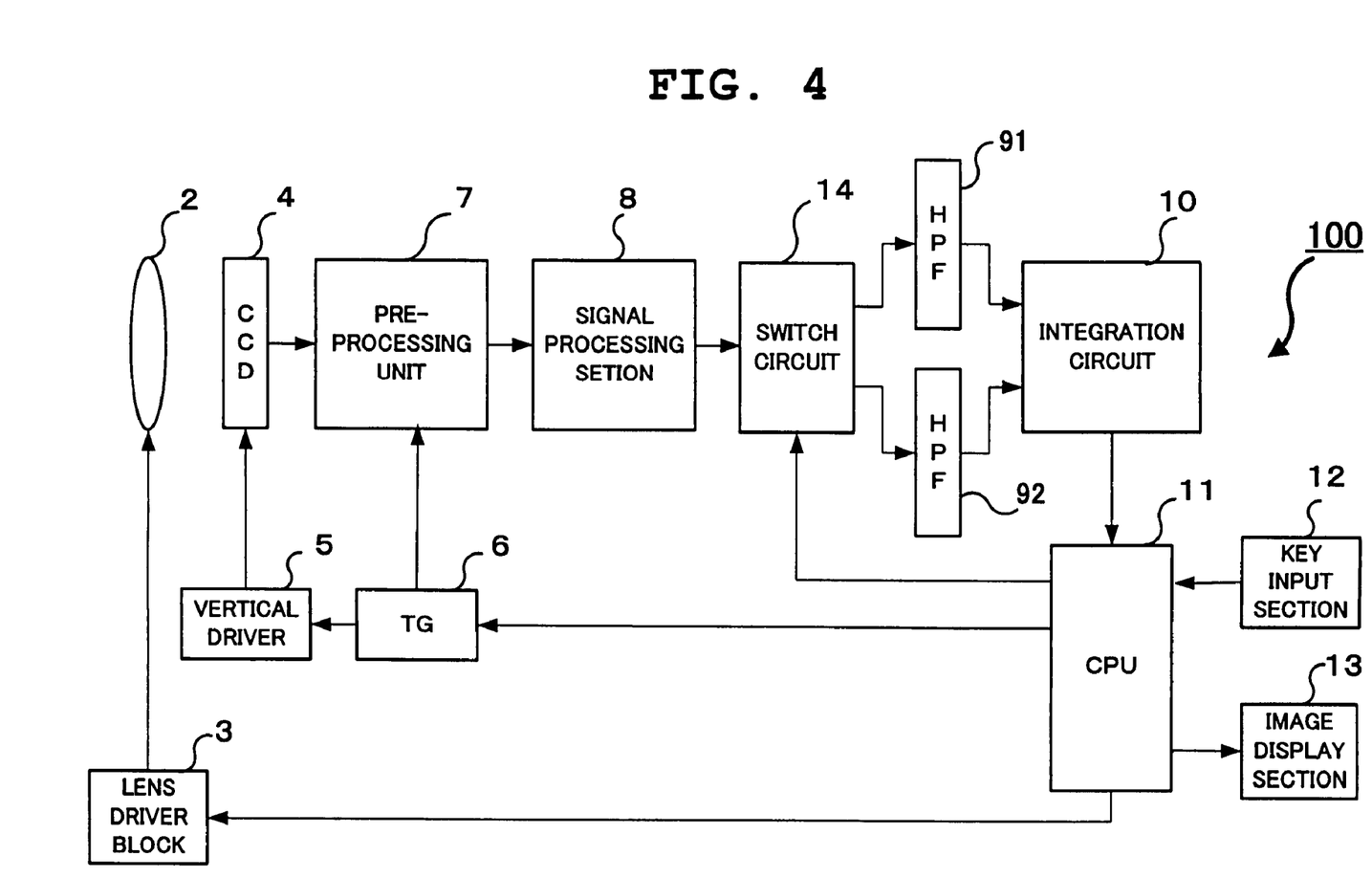
FIG. 4 is a block diagram of a digital camera of a modification of the present invention.

FIG. 4 is a block diagram of a general electrical outline configuration of a digital camera 100 for explaining this modification.

Elements that have the same function as that in FIG. 1 are attached with the same reference numerals and the explanation thereof will be omitted. In FIG. 4, the digital camera 100 includes new configurations: a switch circuit 14, an HPF 91 for which the cut-off frequency has been set high, and an HPF 92 for which the cut-off frequency has been set low.

If the CPU 11 determines that both a high luminosity area and a low luminosity area are present, it controls the switch circuit 14 so as to input the image data of the luminosity color difference signal (YUV data) to the integration circuit 10 via the HPF 91.

On the other hand, if the CPU 11 determines that either of a low luminosity area or a high luminosity area is not present (including a case where only one of the low luminosity area and the high luminosity area is present), the CPU 11 controls the switch circuit 14 so as to input the image data of the luminosity color difference signal (YUV data) to the integration circuit 10 via the HPF 92.

D-3. Modification 3

In addition, it is determined whether or not a high luminosity area and a low luminosity area are present in the focus area in the above-described embodiment. Alternatively, it may be determined whether or not a high luminosity area and low luminosity area are present in the whole image which has been picked up.

In this modification, it is determined whether or not the proportion of the number of pixels that have a higher luminosity than the first threshold to the total number of pixels in the image is larger than the first certain proportion (for example, 0.3%) on the basis of the luminosity signal Y acquired in Step S1. If larger, it is determined that a high luminosity area is present. In addition, it is determined whether or not the proportion of the number of pixels that have a lower luminosity than the second threshold to the total number of pixels in the image is larger than the second certain proportion (for example, 1 to 2%). If larger, it is determined that a low luminosity area is present.

D-4. Modification 4

In addition, it is determined whether or not a high luminosity area and a low luminosity area are present in the focus area also in the above-described modification D-1. Alternatively, it may be determined whether or not both a high luminosity area and a low luminosity area are present in the whole image that has been picked up.

D-5. Modification 5

In addition, the determination on whether or not both a high luminosity area and a low luminosity area are present is made on the basis of the image data acquired immediately after the shutter button has been halfway depressed in the above-described embodiment. Alternatively, the determination on whether or not both a high luminosity area and a low luminosity area are present may be made on the basis of the image data acquired immediately before the shutter button is halfway depressed.

Still further, the digital camera 1 in the above-described embodiment is not limited to the embodiment as described above. It may be a cell phone with camera, a PDA with camera, a PC with camera, an IC recorder with camera or a digital video camera, or any apparatus capable of adjusting a lens position based on the AF processing.

Furthermore, although the processing program of the digital camera which is a preferred embodiment of the present invention is stored in the memory (for example, ROM, etc.) of the digital camera, this processing program is stored on a computer-readable medium and should also be protected in the case of manufacturing, selling, etc. of only the program. In that case, the method of protecting the program with a patent will be realized by the form of the computer-readable medium on which the processing program is stored.

While the present invention has been described with reference to the preferred embodiments, it is intended that the invention be not limited by any of the details of the description therein but includes all the embodiments which fall within the scope of the appended claims.

What is claimed is:

1. A lens position adjustment apparatus comprising:
    a lens;
    an imaging section for detecting light inputted thereto through the lens and outputting image data;
    a determination section for determining whether or not both a high luminosity area and a low luminosity area are present in the image data, based on the image data outputted by the imaging section;
    a control section for controlling a cut-off frequency to be set for a high-pass filter (HPF) which extracts a high frequency component from the image data, when the determination section determines that both a high luminosity area and a low luminosity area are present;
    a calculation section for calculating an evaluation focus parameter for each position of the lens, based on the high frequency component extracted by the control section via the HPF for which a cut-off frequency has been set; and
    a lens position adjustment section for positioning the lens at a position where the evaluation focus parameter calculated by the calculation section becomes a maximum value,
    wherein the determination section determines that both a high luminosity area and a low luminosity area are present, when a proportion of an area of pixels having a high luminosity to the image data exceeds a first certain proportion and a proportion of an area of pixels having a low luminosity to the image data exceeds a second certain proportion.

2. The lens position adjustment apparatus according to claim 1, wherein the first certain proportion is smaller than the second certain proportion.

3. A lens position adjustment apparatus comprising:

a lens;

an imaging section for detecting light inputted thereto through the lens and outputting image data;

a determination section for determining whether or not both a high luminosity area and a low luminosity area are present in the image data, based on the image data outputted by the imaging section;

a control section for controlling a cut-off frequency to be set for a high-pass filter (HPF) which extracts a high frequency component from the image data, when the determination section determines that both a high luminosity area and a low luminosity area are present;

a calculation section for calculating an evaluation focus parameter for each position of the lens, based on the high frequency component extracted by the control section via the HPF for which a cut-off frequency has been set; and a lens position adjustment section for positioning the lens at a position where the evaluation focus parameter calculated by the calculation section becomes a maximum value, wherein the determination section determines that both a high luminosity area and a low luminosity area are present, when a number of pixels having a high luminosity in the image data exceeds a first certain number of pixels and a number of pixels having a low luminosity in the image data exceeds a second certain number of pixels.

4. The lens position adjustment apparatus according to claim 3, wherein the first certain number of pixels is smaller than the second certain number of pixels.

5. A lens position adjustment apparatus comprising:

a lens;

an imaging section for detecting light inputted thereto through the lens and outputting image data;

a determination section for determining whether or not both a high luminosity area and a low luminosity area are present in the image data, based on the image data outputted by the imaging section;

a control section for controlling a cut-off frequency to be set for a high-pass filter (HPF) which extracts a high frequency component from the image data, when the determination section determines that both a high luminosity area and a low luminosity area are present;

a calculation section for calculating an evaluation focus parameter for each position of the lens, based on the high frequency component extracted by the control section via the HPF for which a cut-off frequency has been set; and a lens position adjustment section for positioning the lens at a position where the evaluation focus parameter calculated by the calculation section becomes a maximum value, wherein the determination section determines that both a high luminosity area and a low luminosity area are present, when a difference in luminosity between a luminosity value of a pixel having a high luminosity in the image data and a luminosity value of a pixel having a low luminosity is larger than a preset value.

6. The lens position adjustment apparatus according to claim 5, further comprising:

a first count section for counting pixels starting from a pixel having a low luminosity in the image data;

a first luminosity acquisition section for acquiring the luminosity value when the number of pixels counted by the first count section reaches a third certain value;

a second count section for counting pixels starting from a pixel having a high luminosity; and a second luminosity acquisition section for acquiring the luminosity value when the number of pixels counted by the second count section reaches a fourth certain value, wherein the determination section determines that both a high luminosity area and a low luminosity area are present, in the case where a difference in luminosity between the luminosity value acquired by the first luminosity acquisition section as the luminosity value of a pixel having a high luminosity and the luminosity value acquired by the section luminosity acquisition section as the luminosity value of a pixel having a low luminosity is larger than a preset value.

7. A lens position adjustment apparatus comprising:

a lens;

an imaging section for detecting light inputted thereto through the lens and outputting image data;

a determination section for determining whether or not both a high luminosity area and a low luminosity area are present in the image data, based on the image data outputted by the imaging section;

a control section for controlling a cut-off frequency to be set for a high-pass filter (HPF) which extracts a high frequency component from the image data, when the determination section determines that both a high luminosity area and a low luminosity area are present;

a calculation section for calculating an evaluation focus parameter for each position of the lens, based on the high frequency component extracted by the control section via the HPF for which a cut-off frequency has been set; and a lens position adjustment section for positioning the lens at a position where the evaluation focus parameter calculated by the calculation section becomes a maximum value; and a storage section for accommodating a plurality of coefficient values of the cut-off frequency, wherein the control section controls the coefficient value of the cut-off frequency to be read out from the storage section and set for the HPF when the determination section determines that both a high luminosity area and a low luminosity area are present.

8. A lens position adjustment apparatus comprising:

a lens;

an imaging section for detecting light inputted thereto through the lens and outputting image data;

a determination section for determining whether or not both a high luminosity area and a low luminosity area are present in the image data, based on the image data outputted by the imaging section;

a control section for controlling a cut-off frequency to be set for a high-pass filter (HPF) which extracts a high frequency component from the image data, when the determination section determines that both a high luminosity area and a low luminosity area are present;

a calculation section for calculating an evaluation focus parameter for each position of the lens, based on the high frequency component extracted by the control section via the HPF for which a cut-off frequency has been set; and a lens position adjustment section for positioning the lens at a position where the evaluation focus parameter calculated by the calculation section becomes a maximum value;

a first HPF for which a cut-off frequency with a certain coefficient value has been set;

a second HPF for which a cut-off frequency with a coefficient value which is higher than the certain coefficient value has been set; and a switching section for switching between a first path for processing the image data through the first HPF and a second path for processing the image data through the second HPF, wherein the control section controls the switching section so as to process the image data through the second path, in the case where the determination section determines that both a high luminosity area and a low luminosity area are present.

9. A lens position adjustment method for a lens position adjustment apparatus which comprises a lens, the method comprising:

detecting light inputted through the lens and outputting image data;

determining whether or not both a high luminosity area and a low luminosity area are present in the image data, based on the outputted image data;

controlling a cut-off frequency to be set for a high-pass filter (HPF) which extracts a high frequency component from the image data, when a high luminosity area and a low luminosity area are determined to be present;

calculating an evaluation focus parameter for each position of the lens based on the extracted high frequency component; and positioning the lens at a position where the calculated evaluation focus parameter becomes a maximum value, wherein both a high luminosity area and a low luminosity area are determined to be present, when a proportion of an area of pixels having a high luminosity to the image data exceeds a first certain proportion and a proportion of an area of pixels having a low luminosity to the image data exceeds a second certain proportion.

10. A lens position adjustment method for a lens position adjustment apparatus which comprises a lens, the method comprising:

detecting light inputted through the lens and outputting image data;

determining whether or not both a high luminosity area and a low luminosity area are present in the image data, based on the outputted image data;

controlling a cut-off frequency to be set for a high-pass filter (HPF) which extracts a high frequency component from the image data, when a high luminosity area and a low luminosity area are determined to be present;

calculating an evaluation focus parameter for each position of the lens based on the extracted high frequency component; and positioning the lens at a position where the calculated evaluation focus parameter becomes a maximum value, wherein both a high luminosity area and a low luminosity area are determined to be present, when a number of pixels having a high luminosity in the image data exceeds a first certain number of pixels and a number of pixels having a low luminosity in the image data exceeds a second certain number of pixels.

11. A lens position adjustment method for a lens position adjustment apparatus which comprises a lens, the method comprising:

detecting light inputted through the lens and outputting image data;

determining whether or not both a high luminosity area and a low luminosity area are present in the image data, based on the outputted image data;

controlling a cut-off frequency to be set for a high-pass filter (HPF) which extracts a high frequency component from the image data, when a high luminosity area and a low luminosity area are determined to be present;

calculating an evaluation focus parameter for each position of the lens based on the extracted high frequency component; and positioning the lens at a position where the calculated evaluation focus parameter becomes a maximum value, wherein both a high luminosity area and a low luminosity area are determined to be present, when a difference in luminosity between a luminosity value of a pixel having a high luminosity in the image data and a luminosity value of a pixel having a low luminosity is larger than a preset value.

12. A computer-readable medium having a program stored thereon that is executable by a computer of a lens position adjustment apparatus, which comprises a lens, the program being executable by the computer to perform functions comprising:

detecting light inputted through the lens and outputting image data;

determining whether or not both a high luminosity area and a low luminosity area are present in the image data, based on the outputted image data;

controlling a cut-off frequency to be set for a high-pass filter (HPF) which extracts a high frequency component from the image data, when both a high luminosity area and a low luminosity area are determined to be present;

calculating an evaluation focus parameter for each position of the lens based on the extracted high frequency component; and positioning the lens at a position where the calculated evaluation focus parameter becomes a maximum value, wherein both a high luminosity area and a low luminosity area are determined to be present, when a proportion of an area of pixels having a high luminosity to the image data exceeds a first certain proportion and a proportion of an area of pixels having a low luminosity to the image data exceeds a second certain proportion.

13. A computer-readable medium having a program stored thereon that is executable by a computer of a lens position adjustment apparatus, which comprises a lens, the program being executable by the computer to perform functions comprising:

detecting light inputted through the lens and outputting image data;

determining whether or not both a high luminosity area and a low luminosity area are present in the image data, based on the outputted image data;

controlling a cut-off frequency to be set for a high-pass filter (HPF) which extracts a high frequency component from the image data, when both a high luminosity area and a low luminosity area are determined to be present;

calculating an evaluation focus parameter for each position of the lens based on the extracted high frequency component; and positioning the lens at a position where the calculated evaluation focus parameter becomes a maximum value, wherein both a high luminosity area and a low luminosity area are determined to be present, when a number of pixels having a high luminosity in the image data exceeds a first certain number of pixels and a number of pixels having a low luminosity in the image data exceeds a second certain number of pixels.

14. A computer-readable medium having a program stored thereon that is executable by a computer of a lens position adjustment apparatus, which comprises a lens, the program being executable by the computer to perform functions comprising:

detecting light inputted through the lens and outputting image data;

determining whether or not both a high luminosity area and a low luminosity area are present in the image data, based on the outputted image data;

controlling a cut-off frequency to be set for a high-pass filter (HPF) which extracts a high frequency component from the image data, when both a high luminosity area and a low luminosity area are determined to be present;

calculating an evaluation focus parameter for each position of the lens based on the extracted high frequency component; and positioning the lens at a position where the calculated evaluation focus parameter becomes a maximum value, wherein both a high luminosity area and a low luminosity area are determined to be present, when a difference in luminosity between a luminosity value of a pixel having a high luminosity in the image data and a luminosity value of a pixel having a low luminosity is larger than a preset value.

* * * * *